United States Patent Office 3,064,004
Patented Nov. 13, 1962

3,064,004
PRODUCTION OF N-VINYL-2-OXAZOLIDONES
Edwin D. Little, Hopewell, Va., assignor to Allied Chemical Corporation, New York, N.Y., a corporation of New York
No Drawing. Filed Dec. 5, 1960, Ser. No. 73,516
7 Claims. (Cl. 260—307)

The present invention relates to a process for the production of N-vinyl-2-oxazolidones having the following structural formula:

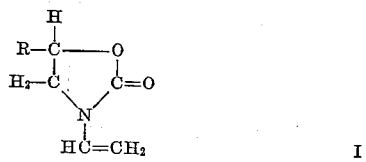

wherein R is selected from the group consisting of hydrogen and an alkyl radical containing from 1 to 4 carbon atoms, from the corresponding 2-oxazolidones having the following structural formula:

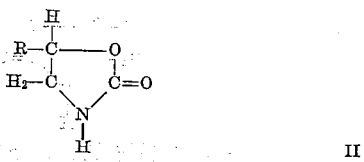

wherein R is as defined above.

The N-vinyl-2-oxazolidones are cyclic carbamates having a wide variety of uses. For example, they may be homopolymerized or copolymerized under a wide variety of conditions to yield valuable plastic articles. In addition, they are useful in coating compositions and in adhesives, and are valuable intermediates for dye-stuffs, dye-receptors and textile assistants.

Conventional methods for the production of N-vinyl-2-oxazolidones are subject to numerous disadvantages. These methods either involve the use of expensive materials, or require numerous process steps, or utilize an explosive reaction which is hazardous to operating personnel, or combinations of these.

It is, therefore, an object of the present invention to provide a process for the production of N-vinyl-2-oxazolidones.

It is a further object of the present invention to provide a simple and economical process for the production of N-vinyl-2-oxazolidones in good yields.

It is a still further object of the present invention to provide a process for the production of N-vinyl-2- oxazolidones by a non-explosive and non-hazardous reaction.

Other objects and advantages of the present invention will appear hereinafter.

In accordance with the process of the present invention, it has been found that N-vinyl-2-oxazolidones having the structural Formula I above may be simply and expeditiously prepared, accomplishing the foregoing objects and advantages of the present invention, by reacting together at a pH of less than 7 (1) a 2-oxazolidone having the structural Formula II above and (2) acetaldehyde. The compounds obtained by the process of the present invention are: N-vinyl-2-oxazolidone; N-vinyl-5-methyl-2-oxazolidone; N-vinyl-5-ethyl-2-oxazolidone; N-vinyl-5-propyl-2-oxazolidone; and N-vinyl-5-butyl-2-oxazolidone.

The reaction should be conducted at a pH of less than 7 and preferably from 1.0 to 6.0. If necessary, a small amount of acid may be added to the reaction mixture in order to attain the desired pH. In such use, the acid is generally added in amount from about 0.0006 to 0.01 percent by weight of the reaction mixture. Any acid may be conveniently employed; sulfuric, hydrochloric, acetic, nitric, phosphoric, propionic, and para-toluene sulfonic acids are representative. Other ingredients may also be used to lower the pH, if desired. Typical of these are hydrogen ion-containing ion exchange resins, salts of strong acids, and salts of weak bases.

The temperature of the reaction is not critical; practically, however, it is preferred to operate in the range of about 0° C. to 180° C. If desired, the reactants may simply be mixed together at room temperature, with an attendant slow rise in the temperature of the reaction mixture. Normally a condenser is employed which returns liquid acetaldehyde to the reaction mixture.

Similarly the proportion of reactants is not critical. Preferably, however, a molar excess of the acetaldehyde is employed. One reason for this preference is that the reaction occurs in the liquid phase and acetaldehyde has a low boiling point; therefore, the excess acetaldehyde is desired in order to maintain this reactant in the reaction mixture in liquid phase. It has been found that the preferred mole proportions are from 1.2 to 12 moles of acetaldehyde per mol of 2-oxazolidone. If lower than 1.2 moles of acetaldehyde are employed, the yield is undesirably reduced. Higher amounts than 12 moles of acetaldehyde may be used, but the excess results in no particular advantage.

The process of the present invention may be operated at atmospheric pressure. When elevated temperatures are employed, however, sufficient pressure should be utilized to maintain the bulk of the acetaldehyde in the liquid phase.

The reaction times are not critical; however, preferably from 1 to 48 hours are employed. The reaction time will naturally vary depending upon the temperature of the reaction, the pressure employed, the particular reactants, and the mole proportion of reactants.

A solvent may be employed in the process of the present invention, if desired. If a solvent is employed, it should be capable of dissolving both reactants and it should be substantially non-reactive with the reactants and reaction product. Typical solvents which may be employed include, for example, water, methanol, ethanol, chloroform, carbon tetrachloride, acetone, and diethyl ether.

When the 2-oxazolidone reactant is reacted with acetaldehyde, an intermediate hydroxy compound is formed, which compound spontaneously decomposes at temperatures above 0° C. to yield the desired N-vinyl-2-oxazolidone product. It is preferred to conduct the reaction above 20° C. to insure complete conversion of the intermediate product. The reaction may be represented by the following equation:

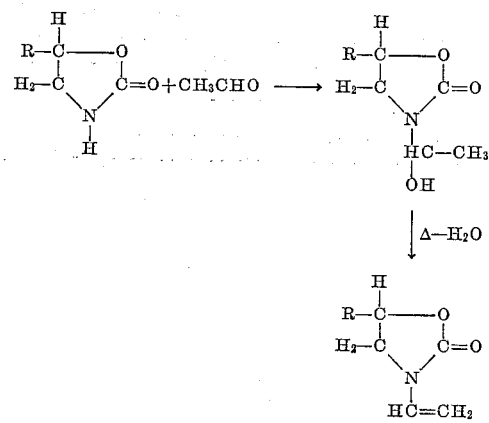

After the reaction has been completed, excess acetaldehyde and solvent (if employed) are removed by any convenient means, such as distillation or evaporation.

N-vinyl-2-oxazolidone product is then recovered from the residual mass by any convenient means, such as by heating the mass at low pressure, preferably not above 3 mm. of mercury, and at a temperature of at least 180° C., preferably from 180° to 240° C., to distill off the product.

The following examples will serve to further illustrate the process of the present invention. In the examples, parts are by weight except where otherwise indicated.

*Example 1*

A stirred autoclave was charged with 25 parts of 5-methyl-2-oxazolidone, 19.6 parts acetaldehyde, and sufficient concentrated HCl (0.05 ml.) to produce a pH of 2 (a small part of the reaction mixture was diluted with water to a concentration of about 5% to determine the pH). The autoclave was flushed with nitrogen and pressured to 200 p.s.i.g. with nitrogen at room temperature. The autoclave was heated to 170° C. in 45 minutes, held at 170° C. for one hour, then cooled to room temperature. The maximum pressure obtained was about 550 p.s.i.g. The contents of the autoclave were liquid and were removed and the excess acetaldehyde (11.7 parts) separated by distillation. The residual red-colored liquid was fractionated in vacuo through a 1-2 theoretical plate column. Two N-vinyl-5-methyl-2-oxazolidone fractions were collected, one at a pot temperature of 100–120° C. (overhead 87–91° C. at 0.8 mm. Hg), the second at 180–235° C. pot temperature (overhead 115–125° C. at about 1 mm. Hg). The combined fractions constituted 4.5 parts. 19 parts of unreacted 5-methyl-2-oxazolidone were collected between the two vinyl oxazolidone fractions at pot temperature of 130–160° C. (overhead 108–112° C. at about 1 mm. Hg). Yield based on consumed oxazolidone reactant was about 60 percent of theory. The N-vinyl-5-methyl-2-oxazolidone produced had an $n_D^{25}$ 1.4753 (literature $n_D^{25}$ 1.4752) and showed characteristic infrared absorption bands for the vinyl group and the oxazolidone ring. The N-vinyl-5-methyl-2-oxazolidone product rapidly decolorized bromine water, potassium permanganate soltuion and a bromine - carbon tetrachloride solution. A nitrogen analysis of the product gave 10.90 percent N (theory 11.03).

*Example 2*

In a 3-necked flask equipped with a stirrer, thermometer and a Dry Ice cooled reflux condenser were placed 25 parts 5 - methyl-2-oxazolidone, 19.6 parts acetaldehyde, and sufficient HCl to bring the pH to 2 (0.05 ml. of conc. HCl). The mixture was stirred and refluxed for four hours; during this time the temperature of the solution rose from 22° C. to about 40° C. as a solid slowly formed. The mixture was cooled and allowed to stand to promote further precipitation. The solid was removed by filtration and fractionated as in Example 1 to give 7.5 parts N-vinyl-5-methyl-2-oxazolidone and 16.5 parts unreacted 5-methyl-2-oxazolidone. Yield based on consumed oxazolidone reactant was about 70% of theory.

*Example 3*

Example 2 was repeated using double amounts of the reactants without the addition of acid to lower the pH. The pH of the reaction mixture was 6.5. 46 parts of unreacted 5-methyl-2-oxazolidone and 2.5 parts of N-vinyl-5-methyl-2-oxazolidone were recovered. Yield based on consumed oxazolidone reactant was about 50% of theory.

Since various changes and modifications may be made in the invention without departing from the spirit thereof, it is intended that all matter contained in the above description shall be interpreted as illustrative and not in a limiting sense.

I claim:

1. A process for the production of an N-vinyl-2-oxazolidone having the following formula:

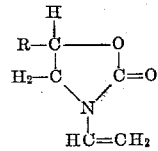

wherein R is selected from the group consisting of hydrogen and alkyl of 1 to 4 carbon atoms, which comprises reacting together at a pH of less than 7 and at a temperature above 20° C. (1) a 2-oxazolidone having the following formula:

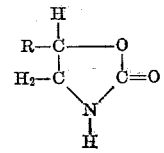

wherein R is as defined above, and (2) a molar excess of acetaldehyde, and recovering the N-vinyl-2-oxazolidone from the reaction mass by distillation at low pressure.

2. A process according to claim 1 wherein 1.2 to 12 moles of acetaldehyde per mole of the 2-oxazolidone are employed.

3. A process according to claim 2 wherein the reaction is conudcted at a temperature above 20° C. up to 180° C.

4. A process according to claim 3 wherein the reaction is conducted at a pH of from 1.0 to 6.0.

5. A process according to claim 1 wherein the oxazolidone reactant is 5-methyl-2-oxazolidone and N-vinyl-5-methyl-2-oxazolidone is recovered as product of the process.

6. A process according to claim 1 wherein the oxazolidone reactant is 5-ethyl-2-oxazolidone and N-vinyl-5-ethyl-2-oxazolidone is recovered as product of the process.

7. A process according to claim 1 wherein the oxazolidone reactant is 2-oxazolidone and N-vinyl-2-oxazolidone is recovered as product of the process.

References Cited in the file of this patent

UNITED STATES PATENTS

| | | |
|---|---|---|
| 2,818,362 | Drechsel | Dec. 31, 1957 |
| 2,973,366 | Bimber | Feb. 28, 1961 |

OTHER REFERENCES

Breitenbach et al.: Chem. Abstracts, vol. 50, column 12972 (1956).